United States Patent

Slezak

(10) Patent No.: US 8,510,931 B2
(45) Date of Patent: Aug. 20, 2013

(54) METHOD TO REDUCE SERVO PATTERN RUNOUT ON A PREWRITTEN DISC

(75) Inventor: Arnold G. Slezak, Yukon, OK (US)

(73) Assignee: Seagate Technology LLC, Cupertino, CA (US)

( * ) Notice: Subject to any disclaimer, the term of this patent is extended or adjusted under 35 U.S.C. 154(b) by 2191 days.

(21) Appl. No.: 09/981,556

(22) Filed: Oct. 17, 2001

(65) Prior Publication Data

US 2002/0178571 A1    Dec. 5, 2002

Related U.S. Application Data

(60) Provisional application No. 60/286,184, filed on Apr. 24, 2001.

(51) Int. Cl.
    *G11B 5/48* (2006.01)
(52) U.S. Cl.
    USPC .......... 29/603.03; 29/603.01; 29/603.09; 360/77.02; 360/98.08; 360/99.12; 324/210; 324/212
(58) Field of Classification Search
    USPC .......... 324/210, 212; 360/98.08, 99.12, 360/77.02, 77.03; 29/603.01, 603.09, 593, 29/603.014; 219/121.6
    See application file for complete search history.

(56) References Cited

U.S. PATENT DOCUMENTS

| 3,824,572 | A | * | 7/1974 | Morehouse | 360/98.08 |
| 4,224,648 | A | * | 9/1980 | Roling | 360/98.08 X |
| 5,870,241 | A | | 2/1999 | Ottesen et al. | |
| 5,978,169 | A | | 11/1999 | Woods | |
| 5,987,735 | A | * | 11/1999 | Horning et al. | 29/603.03 X |
| 6,081,990 | A | * | 7/2000 | Kuroba et al. | 29/603.01 |
| 6,094,804 | A | | 8/2000 | Chuang et al. | |
| 6,178,063 | B1 | | 1/2001 | Wood et al. | |
| 6,229,303 | B1 | * | 5/2001 | Guzik | 324/212 |
| 2003/0193735 | A1 | * | 10/2003 | Kuo et al. | 360/77.03 |

FOREIGN PATENT DOCUMENTS

| JP | 4-157683 | * | 5/1992 |
| JP | 4-157683 A | | 5/1992 |
| JP | 5-205442 | * | 8/1993 |
| JP | 5-205442 A | | 8/1993 |

\* cited by examiner

*Primary Examiner* — A. Dexter Tugbang
(74) *Attorney, Agent, or Firm* — Mitchell K. McCarthy; McCarthy Law Group

(57) ABSTRACT

A disc drive disc stack assembly and a method for forming the disc stack assembly to reduce servo pattern runout. The disc stack assembly includes a number of prewritten discs having a servo pattern and a disc alignment mark. The first step is to place a first disc about a spindle motor hub of the disc drive. The second step is to align a disc alignment mark of the first disc in relation to a direction of a biasing force. The third step is to apply the biasing force to the first disc to engage the first disc against the spindle motor hub. The fourth step is to repeat the first three steps for each remaining disc in the disc stack assembly. The final step is to clamp the prewritten discs with a disc clamp to secure the position of each prewritten disc relative to the spindle motor hub.

11 Claims, 2 Drawing Sheets

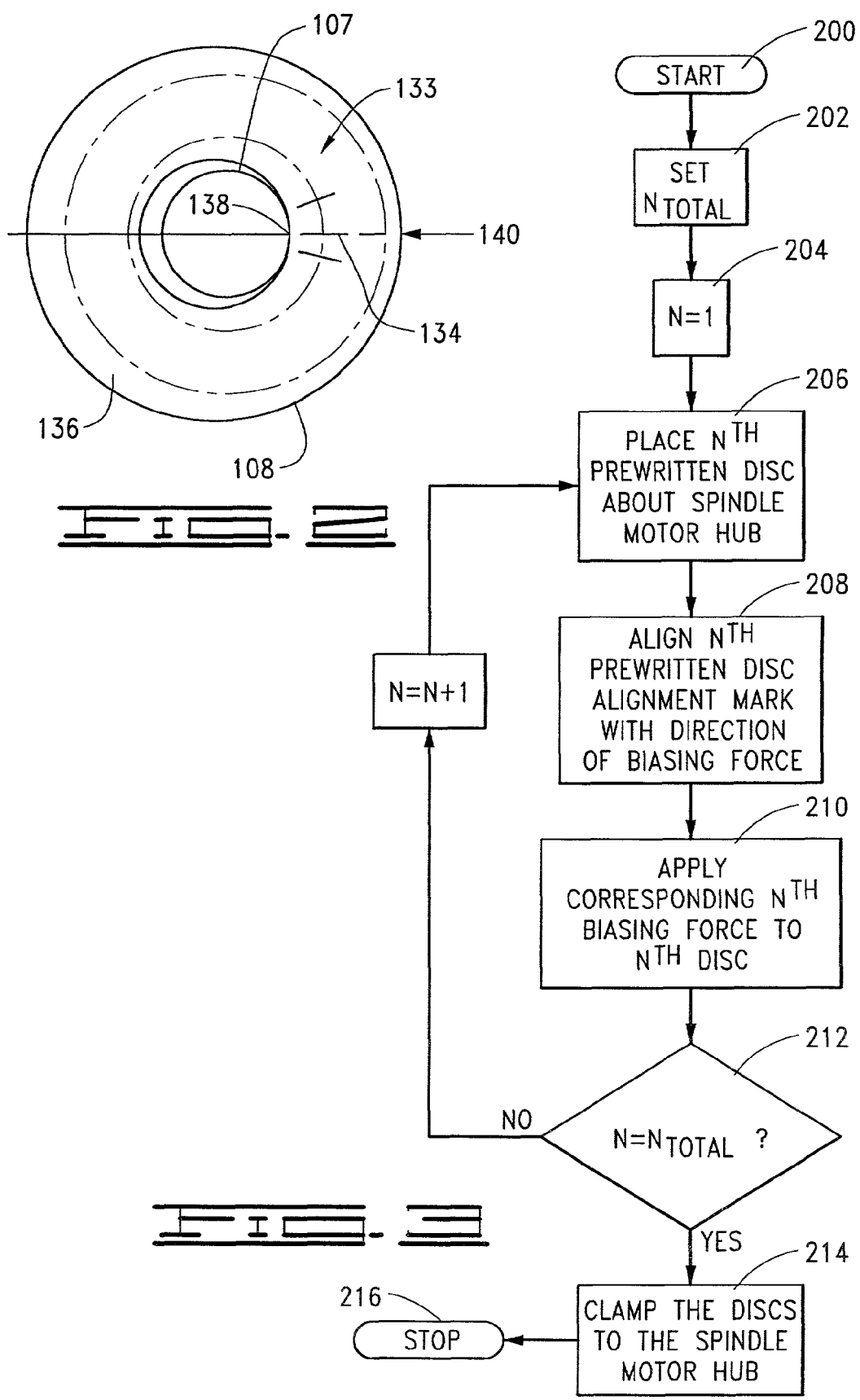

METHOD TO REDUCE SERVO PATTERN RUNOUT ON A PREWRITTEN DISC

RELATED APPLICATIONS

This application claims the benefit of U.S. Provisional Application No. 60/286,184 entitled METHOD TO REDUCE SERVO PATTERN RUNOUT ON A PREWRITTEN DISC filed Apr. 24, 2001.

FIELD OF THE INVENTION

The claimed invention relates generally to disc drive data storage devices and more particularly to methods for reducing servo pattern runout for the disc drive.

BACKGROUND OF THE INVENTION

Data storage devices of the type known as "Winchester" disc drives are well known in the industry. These disc drives magnetically record digital data on several circular, concentric data tracks on the surfaces of one or more rigid discs. The discs are typically mounted for rotation on the hub of a spindle motor. In disc drives of the current generation, the discs are rotated at speeds of up to 15,000 revolutions per minute.

Data are recorded to and retrieved from the discs by an array of vertically aligned read/write head assemblies, or heads, which are controllably positioned by an actuator assembly. Each head typically includes electromagnetic transducer read and write elements which are carried on an air bearing slider. The slider acts in a cooperative hydrodynamic relationship with a thin layer of air dragged along by the spinning discs to fly each head in a closely spaced relationship to the disc surface. In order to maintain the proper flying relationship between the heads and the discs, the heads are attached to and supported by head suspensions or flexures. The data are written as tracks on the disc surface.

A closed loop servo system is typically used to control the position of the heads relative to the data tracks. The servo system generates a position error signal (PES) indicative of the position of the heads from servo information that is written to the discs during manufacturing of the disc drive. In response to the detected position, the servo system outputs current to an actuator motor (such as a voice coil motor, or VCM) used to pivot the actuator assembly, including the heads, over the disc surfaces.

It is an ever increasing trend in the industry to provide successive generations of disc drive products with ever increasing data storage capacities and data transfer rates. Because the disc surface area available for recording data remains substantially constant or even decrease as disc drive form factors become smaller, substantial advancement in areal recording densities, both in terms of number of bits that can be recorded on each track as well as the number of tracks on each disc, are continually being made in order to facilitate such increases in data capacity.

In the existing art, the servo information used to define the tracks has been written during disc drive manufacturing (after assembly of disc stack) using a highly precise servo track writer. While the tracks have been intended to be concentric, uncontrolled factors such as bearing tolerances, spindle resonance, and misalignment of the discs tend to introduce errors in the location of the servo information. Each track has been not perfectly concentric, but instead exhibits some random, repeatable variations. These variations are referred to as repeatable servo pattern runout (or RRO) and the RRO appears as a component of the PES. Variations that are not repeated are referred to as non-repeated servo pattern runout (NRRO).

RRO has become increasingly important as the track densities on a disc have increased. Ultimately, RRO can lead to an upper limit on the achievable track densities because the control of RRO consumes a part of a track alignment budget. Also, RRO reduces the range over which the servo system can provide stable servo control.

Recent advances in disc drive manufacturing have created a need for a disc drive with the servo information written, or prewritten, to the discs prior to assembly of the disc stack. In particular, some manufacturing efficiency has been realized by pre-writing the servo information to the discs during manufacturing of the discs themselves.

Thus, there is a need for a method for assembling the discs in a disc stack that minimizes servo pattern runout.

SUMMARY OF THE INVENTION

In accordance with preferred embodiments, a disc drive assembly and a method for forming the disc drive assembly are provided to reduce servo pattern runout. The disc stack assembly includes a number of prewritten discs, each having a prewritten servo pattern and a disc alignment mark. The first step is to place a first prewritten disc about the spindle motor hub of the disc drive. The second step is to align the disc alignment mark of the first disc in relation to a direction of a corresponding biasing force. The third step is to apply the corresponding biasing force to the first prewritten disc to pressingly engage the first prewritten disc against the spindle motor hub. The fourth step is to repeat the first step, the second step and the third step for each of the remaining prewritten discs in the disc stack assembly. The final step is to clamp the prewritten discs with a disc clamp to secure the position of each prewritten disc relative to the spindle motor hub.

These and various other features and advantages which characterize the claimed invention will be apparent upon reading the following detailed description and upon reviewing the associated drawings.

BRIEF DESCRIPTION OF THE DRAWINGS

FIG. 2 is a plan schematic view of a disc and spindle of a disc drive constructed in accordance with a preferred embodiment of the present invention.

FIG. 3 is a flow chart for a method of forming a disc stack assembly for a disc drive using one or more discs such as illustrated in FIG. 2.

DETAILED DESCRIPTION

Figure 1:
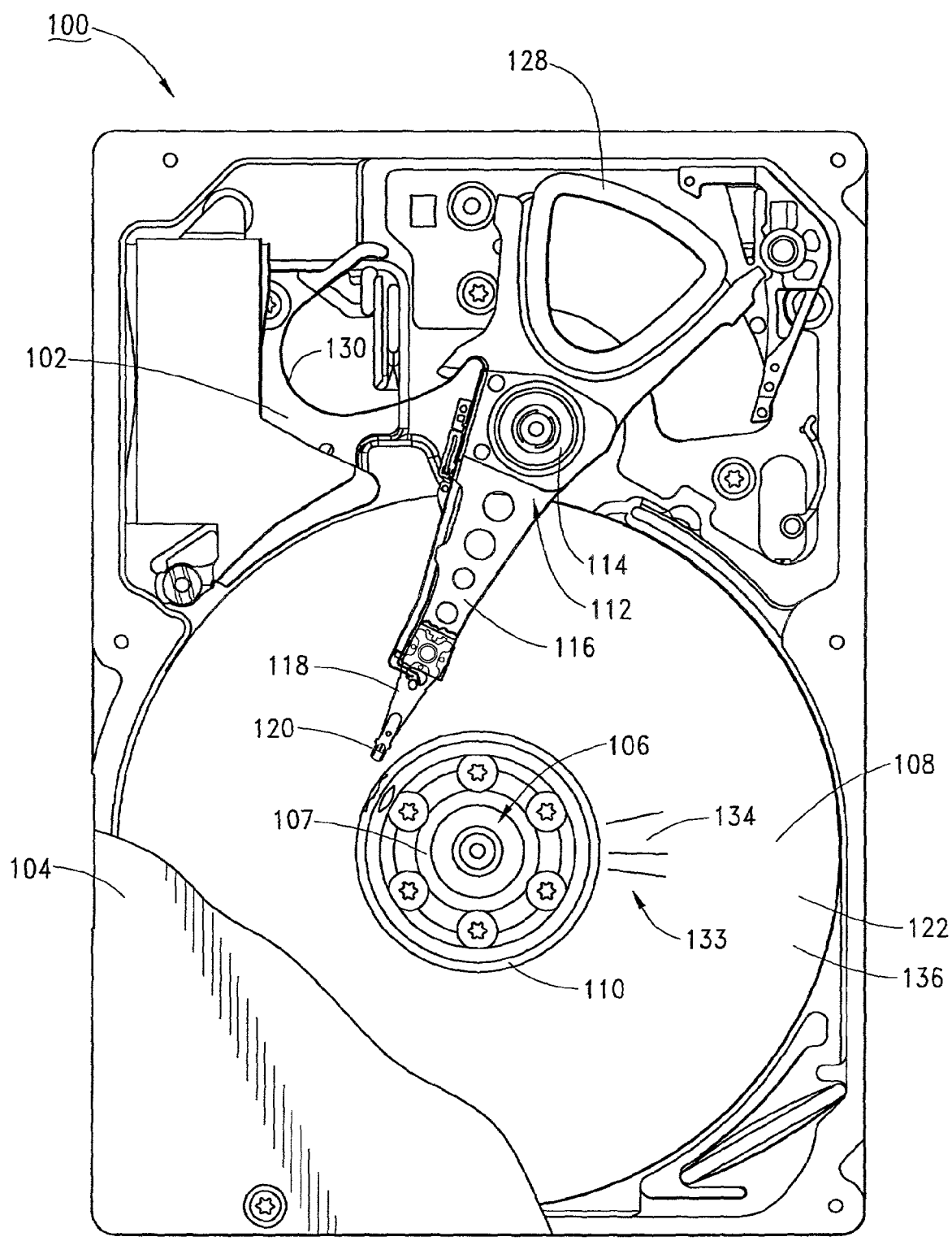
FIG. 1 is a plan view of a disc drive constructed in accordance with a preferred embodiment of the present invention.

Referring to the drawings in general, and more particularly to FIG. 1, shown therein is a top view of a disc drive 100 constructed in accordance with a preferred embodiment of the claimed invention. The disc drive 100 includes a base deck 102 to which various disc drive components are mounted. The disc drive 100 also has a cover (not shown) that, together with the base deck 102, forms a housing of the disc drive 100. Numerous details of construction of the disc drive 100 are not included in the following description because these details of construction are well known to those skilled in the art and are unnecessary to describe the embodiments disclosed herein.

A spindle motor 106 having a spindle motor hub 107 is mounted to the base deck 102, and one or more prewritten discs 108 are in turn mounted to the spindle motor hub 107. A disc clamp 110 secures the prewritten discs 108 to the spindle motor hub 107 for rotation at constant high speed. The prewritten discs 108, the spindle motor hub 107 and the disc clamp 110 together form a disc stack assembly.

An actuator assembly 112 is located next to the prewritten discs 108. The actuator assembly 112 pivots about a pivot bearing assembly 114 in a plane parallel to the prewritten discs 108. The actuator assembly 112 includes actuator arms 116 that support load arm assemblies 118. The load arm assemblies 118, in turn, support read/write heads 120 with each of the read/write heads 120 adjacent a surface of one of the discs 108. The read/write heads 120 are maintained in a data reading or data writing spatial relationship using conventional slider assemblies (not shown), which support the read/write heads 120.

Each of the prewritten discs 108 has a data storage location with a data recording surface 122 divided into concentric circular data tracks (not shown) and the read/write heads 120 are located adjacent the data tracks to read data from or write data to the data tracks. The data recording surface 122 has a circular, texturized landing zone near an inner diameter of one of the prewritten discs 108 where the read/write head 120 comes to rest when the disc drive 100 is not in use.

The actuator assembly 112 is positioned by a voice coil motor (VCM) through application of current to an actuator coil 128. A flex circuit 130 provides the necessary electrical conduction paths between the actuator assembly 112 and a disc drive printed circuit board (not shown). The disc drive printed circuit board mounts to an underside of the base deck 102.

The prewritten disc 108 has servo information written on the disc 108 prior to assembly of the disc stack assembly. In a typical case, the prewritten disc 108 has the servo information written at the time of manufacturing of the discs 108. The servo information controls the movement of the actuator assembly 112 in positioning the heads 120 for reading data from the prewritten disc 108.

When the servo information is prewritten to the disc 108, three radial lines 133 are made on both an upper surface 136 and a lower surface (not shown) of the disc 108. A middle line of the three radial lines is an alignment mark 134. The three radial lines 133 can be made by a laser, which is typically used to form the texturized landing zones on the disc surfaces. The three radial lines 133 are written near an inner diameter of the disc 108. Locating the radial lines 133 on the upper surface 136 and the lower surface of the disc, as opposed to an edge of the disc, allows the radial lines 133 to be located quickly with an automated optical detector. The angular spacing between the three radial lines 133 is not uniform, but the radial lines 133 form a pattern that is similar on the upper surface 136 and the lower surface of the disc 108. However, the pattern on the lower surface is a reflection about the middle radial line when compared to the pattern on the upper surface 138. As a result, the pattern may be used to identify the upper surface 138 and the lower surface.

FIG. 2 shows a schematic diagram of a prewritten disc 108 disposed about a spindle motor hub 107. The separation of the prewritten disc 108 and the spindle motor hub 107 has been greatly exaggerated in FIG. 2 for the purpose of illustration. In fact, the actual separation between the disc 108 and the spindle motor hub 107 is not typically discernible with the naked eye. The dotted lines represent lines of concentricity with respect to the spindle motor hub 107.

The alignment mark 134 is located near an inner diameter of the prewritten disc 108 at a same angular position as a disc-to-hub contact point 138, which is at an inner diameter of the prewritten disc 108. The alignment mark 134 is aligned with a biasing force 140. The biasing force 140 is typically applied by an assembly tool attached to a robotic arm.

FIG. 3 shows a flow chart for a method for forming a disc stack assembly to reduce servo pattern runout error for a prewritten disc 108. The method begins at step 200. At step 202, a variable $N_{TOTAL}$ is defined to be the total number of prewritten discs 108 in the disc drive 100. At step 204, a disc counter variable N is initialized as one.

At step 206, the $N^{TH}$ prewritten disc 108 is placed about the spindle motor hub 107. At step 208, the prewritten disc alignment mark 134 is aligned with a direction of a biasing force 140. At step 210, the corresponding $N^{TH}$ biasing force 140 is applied to the $N^{TH}$ disc. At step 212, the values of N and $N_{TOTAL}$ are compared. If the value of N is less than $N_{TOTAL}$, the method increase the value of N by one and returns to step 206. If the value of N is equal to $N_{TOTAL}$, the method proceeds to step 214. At step 214, the prewritten discs 108 are clamped to the spindle motor hub 107. The method stops at step 216.

In one preferred embodiment for a single prewritten disc 108, the entire assembly process is robotically performed. In this preferred embodiment, a robot assembly includes a robotic controller, a robotic arm, an optical detector, a servo system and an assembly tool. The robotic arm picks up the prewritten disc 108 and positions the prewritten disc 108 about the spindle motor hub 107. An optical detector scans the prewritten disc 108 to locate the alignment mark 134. The robotic arm then rotates the prewritten disc 108, using the robotic assembly servo system to monitor the position of the prewritten disc 108, until the alignment mark 134 is aligned with a direction of a biasing force 140, which direction is stored in a memory of the robotic controller.

The biasing force 140 is then applied to the prewritten disc 108 by pressing the assembly tool against an outer diameter of the prewritten disc 108. In turn, an inner diameter of the prewritten disc 108 engages the spindle motor hub 107 at the contact point 138. The position of the prewritten disc 108 is then secured by clamping the prewritten disc 108 to the spindle motor hub 107 by disc clamp 110. Many types of disc clamps are well known in the art and the specifics of clamping the prewritten disc 108 to the spindle motor hub 107 depend on the type of clamp that is used. The installation of the disc clamp 110 completes the formation of the disc stack assembly.

In another preferred embodiment, human workers form the disc stack assembly on an assembly line. In this embodiment, the prewritten disc 108 must have an alignment mark 134 that is discernible to the human eye. A first worker places the prewritten disc about the spindle motor hub 107. After the first worker locates the alignment mark 134, he then applies a biasing force 140 at the outside edge of the disc 108 towards a center of the disc 108. A simple tool such as a screwdriver can be used to apply this biasing force 140. While the first worker applies the biasing force 140, a second worker clamps the prewritten disc 108 to the spindle motor hub 107 to complete the formation of the disc stack assembly.

In yet another preferred embodiment, no alignment mark is placed on the prewritten disc at all. After the servo information has been written to the disc, the position of the disc is precisely monitored relative to the biasing forces used during servo write and placed in a carrier for storage. Then, at the time of forming the disc stack assembly, the prewritten disc is taken from the carrier, placed on the spindle motor hub and biased in precisely the same manner in which it was biased during servo write. For this embodiment, the entire operation is precisely controlled by a computer or programmable controller.

In an embodiment of a disc stack assembly having multiple prewritten discs 108, it is desirable to balance the disc stack assembly for rotation about the spindle motor hub 107. For disc stack assemblies with even numbers of discs, this may be accomplished by applying the biasing force for a particular disc in an opposite direction from any disc above and below that particular disc. For disc stack assemblies with odd numbers of discs, the biasing force should be applied to each disc at even angular intervals about a circumference of the discs 108. For example, if there are three discs, the biasing force for any particular disc should be applied to the outer diameter of the particular disc 108 one-hundred-twenty degrees apart from the direction of each of the biasing forces applied to the remaining two discs 108.

COMPUTER SIMULATION

A computer simulation was performed to compare the variation in position of a data track center for the cases of (a) aligning the alignment mark with the biasing force, and (b) not aligning the alignment mark with the biasing force. The testing parameters for this simulation are presented in Table 1. For the case of using the alignment mark to position the disc on the disc drive spindle as it was oriented on a servo write spindle, the track center shifted in a range of $-6.86 \times 10^{-4}$ cm ($-270$ μin) to $6.60 \times 10^{-4}$ cm ($-260$ μin). For the case of not using the alignment mark, the track shifted $-6.96 \times 10^{-3}$ cm ($-2,740$ μin) to $7.65 \times 10^{-3}$ cm ($3,010$ μin). Thus, a ten-fold improvement (lessening) was realized in the variation in the position of the track center.

TABLE 1

| Servo Writer Spindle | Disc Drive Spindle |
|---|---|
| Disc Hole Inner Diameter = 0.9853 | Disc Hole Inner Diameter = 0.9853 |
| Hub Diameter 0.983100 ± 0.000080 | Hub Diameter = 0.983100 ± 0.000080 |
| Runout = $2.54 \times 10^{-6}$ cm (1 μin) | Runout = $1.016 \times 10^{-3}$ cm (400 μin) |
| Contact Angle Location to Mark = 0 ± 5 degrees | Contact Angle Location to Mark = 0 ± 5 degrees |
| Radial Contact Repeatability = 0 ± $2.54 \times 10^{-4}$ cm (100 μin) | Radial Contact Repeatability = 0 ± $2.54 \times 10^{-4}$ cm (100 μin) |

Accordingly, the claimed invention is directed to a disc drive having a disc stack assembly and a method for forming the disc stack assembly to reduce servo pattern runout. The first step is placing a first prewritten disc (such as 108) about the spindle motor hub (such as 107) of the disc drive (such as 100). The second step is aligning the first prewritten disc middle alignment mark (such as 134) with a direction of a corresponding biasing force (such as 140). The third step is applying the corresponding biasing force to the first prewritten disc to pressingly engage the first prewritten disc against the spindle motor hub. The fourth step is to repeat the first step, the second step and the third step for every other prewritten disc in the disc stack assembly. The final step is to clamp the prewritten discs with a disc clamp (such as 110) to secure the position of each prewritten disc relative to the spindle motor hub.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application while maintaining the same functionality without departing from the spirit and scope of the present invention.

In addition, although the embodiments described herein are directed to a disc stack for a disc drive, it will be appreciated by those skilled in the art that the material can be used for other devices without departing from the spirit and scope of the claimed invention.

What is claimed is:

1. A method comprising:
    placing a plurality of prewritten discs, each prewritten disc having servo tracks characterized by a concentricity offset in a direction of an alignment axis that is in the same angular direction for all of the plurality of prewritten discs in relation to a center of the respective prewritten disc, around a motor hub, the prewritten discs placed around the motor hub with respect to each other so that the alignment axes among the plurality of prewritten discs are angularly disposed symmetrically around the motor hub; and
    after the placing step, biasing each of the plurality of prewritten discs in a direction of the respective alignment axis to concentrically align the servo tracks of a first disc of the plurality of prewritten discs with the servo tracks of a second disc of the plurality of prewritten discs.

2. The method of claim 1 wherein the biasing step comprises pressingly engaging against an edge of each of the prewritten discs.

3. The method of claim 1 wherein the placing step is characterized by at least two of the symmetrically placed alignment axes being non-collinear.

4. The method of claim 1 wherein the placing step is characterized by at least two of the symmetrically placed alignment axes being collinear.

5. The method of claim 1 wherein the placing step is characterized by detecting an indicia on each of the prewritten discs associated with the respective alignment axis.

6. The method of claim 5 wherein the placing step is characterized by the indicia comprising a laser index mark.

7. The method of claim 5 wherein the placing step is characterized by a first indicia on one side of each prewritten disc associated with the respective alignment axis and a second indicia different than the first indicia on the other side of each prewritten disc associated with the respective alignment axis.

8. The method of claim 7 wherein the placing step is characterized by the first indicia comprising a first line that is collinear with the alignment axis and a second line angularly disposed from the first line.

9. The method of claim 8 wherein the placing step is characterized by the first indicia comprising a third line angularly disposed from the first line.

10. The method of claim 9 wherein the placing step is characterized by the second and third lines being nonsymmetrically disposed from the first line.

11. The method of claim 10 wherein the placing step is characterized by the first and second indicia being mirror images of each other.

* * * * *